Jan. 10, 1961     A. G. WESTON     2,967,726
PIVOT PIN SECURING MEANS
Filed May 8, 1958
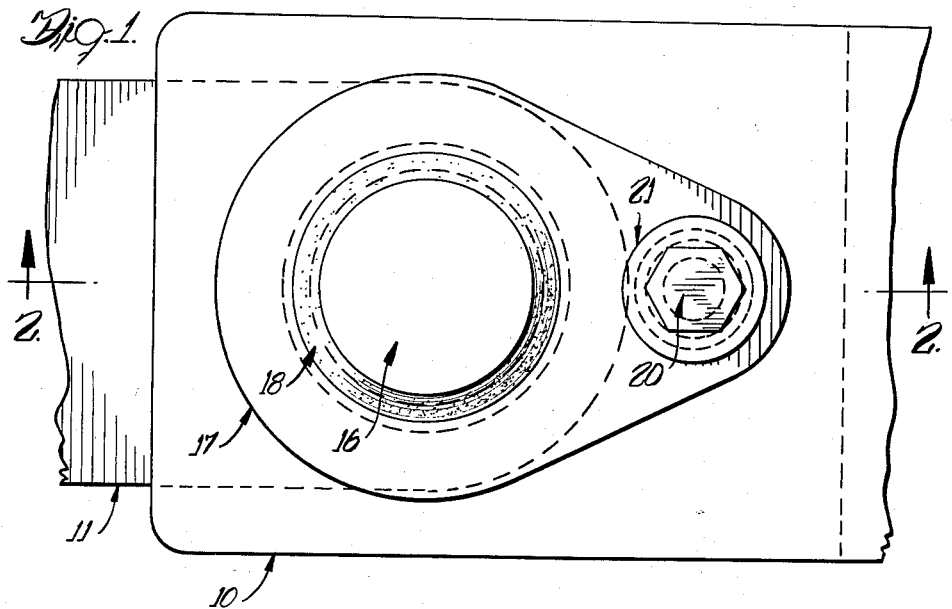
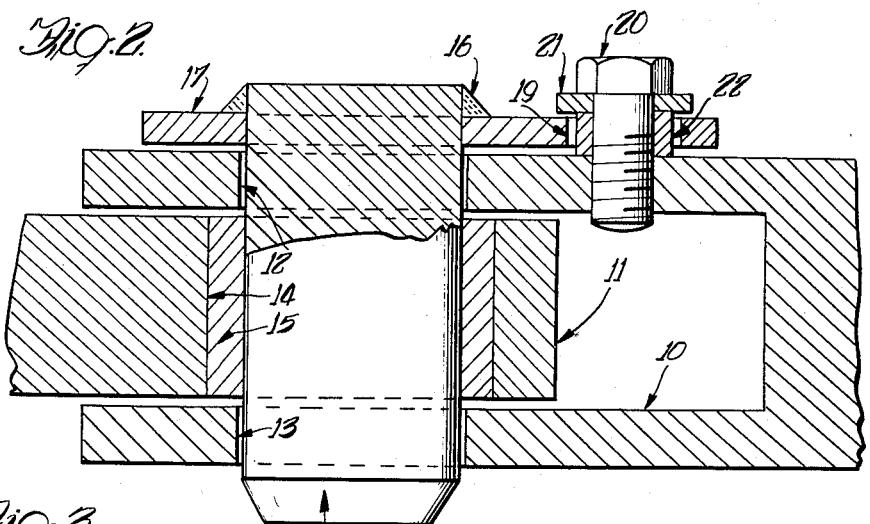
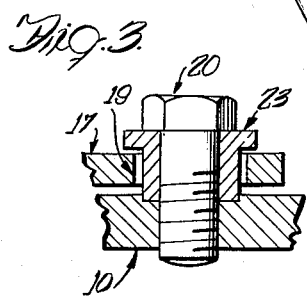
INVENTOR
ALVIN G. WESTON
*Paul O. Pippel*
ATTORNEY

United States Patent Office

2,967,726
Patented Jan. 10, 1961

2,967,726

PIVOT PIN SECURING MEANS

Alvin G. Weston, Mundelein, Ill., assignor to The Frank G. Hough Co., a corporation of Illinois Filed May 8, 1958, Ser. No. 733,984

5 Claims. (Cl. 287—100)

This invention relates generally to mechanical elements pivotally interconnected by a pin, and more specifically to certain means for securing a pivot pin which interconnects relatively large lever arms such as booms used on tractor loaders and other material handling implements.

The subject invention has particular application to tractor loaders of the front end type such as exemplified by Patent No. 2,726,778, issued on December 13, 1955, to F. G. Hough et al. for Tractor Loaders. These tractor loaders and other machines of similar uses generally comprise a prime mover or tractor, some material handling implement such as a digging bucket, and various booms, levers and linkage means interconnecting the material handling implement and the tractor whereby the material handling implement may be operated to work some material by an operator on the tractor. The various booms, levers and linkage means used are usually pivotally interconnected or connected to some support or plate by a relatively short pin of a relatively large diameter. Further, because of manufacturing tolerances the fit between the pin and openings into which it is inserted is generally not a tight one. In use these lever arrangements, such as the boom of a tractor loader, subject the pivot pin to many different substantial forces. Some of these forces tend to dislodge or work the pin out of the boom, other forces tend to deflect the pin along its longitudinal axis, and other forces tend to twist the pin about its longitudinal axis. Many different arrangements have been attempted in the art to secure these pins against the noted forces. Generally these attempts have met with failure or have only been partially satisfactory. For example, known arrangements for preventing dislodgement of the pivot pin may not hold the pin against rotation and consequently twisting forces on the pin will cause its rotation. A number of attempted flanged pin and capscrew arrangements have failed due to the fact that the deflection forces applied to the pin are transmitted through the flange to the capscrew and result in a breaking of the capscrew, since the force is transmitted through the capscrew to the generally weakest portion thereof, the portion at which the capscrew enters the tapped opening.

The object of the present invention is to provide a pivot pin retaining means which will operate under all of the conditions described above to secure the pivot pin against rotation and against disengagement from the parts pivotally interconnected.

It is a further object of the present invention to provide a pivot pin retaining means using a capscrew which will operate to take advantage of the inherent strong rather than weak characteristics of the capscrew.

It is a further object of the present invention to provide a pivot pin arrangement for devices such as tractor loaders and similar material handling implements which is simple in construction, positive in action, economical and of a relatively long life under conditions of hard usage.

It is a feature of the present invention that a compact pivot pin mounting arrangement is provided which may be used to pivotally interconnect members and levers where little clearance is provided between those members and levers and other parts of the machine.

Other objects and features of the present invention will be apparent upon a perusal of the following specification and drawing of which:

Figure 1 is a plan view of the present invention as applied to a pivotally interconnected lever assembly;

Figure 2 is a cross sectional view of the structure shown in Figure 1 and taken along the line 2—2 of Figure 1; and Figure 3 is a partial view of the structure shown in Figure 2 with changes therein to show another embodiment of the present invention.

The present embodiments are the preferred embodiments but it is to be understood that changes can be made in the present embodiments by one skilled in the art without departing from the spirit and scope of the present invention.

For a detailed description of the present invention reference is made to the drawing wherein it may be seen that member 10 which is bifurcated in the present embodiments is one of the two members, the other being 11, which are to be pivotally interconnected. Member 10 is provided with two openings 12 and 13 formed therethrough along the same axis, which openings are constructed with normal manufacturing tolerances whereby the openings may be slightly larger than the pin to be used. In such arrangements it is common to provide a bushing for the other member, and in the present embodiments, member 11 is provided with an opening 14 therethrough into which bushing 15 is inserted. Pin 16 is provided for pivotally interconnecting members 10 and 11, and has a diameter substantially equal to the inner diameter of the bushing 15. Pin 16, which is slightly longer in length than the thickness of the member 10, is provided with a flange 17. Flange 17 is secured on the end of the pin 16 by any means such as welding 18. The flange 17 is provided with an opening 19 radially outwardly from the pin 16. In the first embodiment a capscrew 20, a backup washer 21, and a spacer 22 are further provided for cooperation with the flange 17 of the pin 16 and the opening 19 according to the principles of the present invention. The spacer 22 and the backup washer 21 are formed of a material such as surface hardened steel and may be integrally formed as member 23 in the second embodiment. The spacer 22 and the spacer portion of member 23 are cylindrical in shape and have an outer diameter sufficiently smaller than the diameter of the opening 19 in the flange 17 so that when the pin 16 is deflected along its longitudinal axis, the deflection force will not be transmitted directly through the flange 17 to the spacer 22. The spacer 22 further has a length greater than the thickness of the flange 17, again so that deflection forces applied to the pin 16 from the members 10 and 11 are not transmitted directly to the spacer 22. In the embodiment shown in Figure 3, the member 10 is provided with a cylindrical depressed portion having a diameter equal to the outer diameter of the spacer portion of the member 23, and the spacer portion of the member 23 has a length sufficiently greater than the thickness of the flange 17 and the depth of the depressed portion of the member 10 so that when the pin 16 is deflected along its longitudinal axis, the deflection forces are not applied through the flange 17 directly to the spacer portion of member 23. These arrangements thereby compensate for the manufacturing tolerances in the openings 12 and 13 of the member 10. The inner diameters of the spacer 22, the backup washer 21 and the member 23 are substantially equal to the diameter of the capscrew 20. The outer diameters of the backup washer 21 and the backup washer portion of member 23 are greater than the diameter of the opening 19 in the flange 17 to prevent the pin 16 from moving out of engagement with the members 10 and 11. The capscrew 20 with the backup washer 21 and the spacer 22 or the member 23 mounted thereon is threaded into a suitable tapped hole in the member 10 and is tightened to securely hold the backup washer 21 and the spacer 22 between the head thereof and the member 10. This tightening of the capscrew 20 places it in tension and thereby increases its fatigue limit. The arrangement of the capscrew intension as shown in the construction of Figure 2 takes advantage of the inherent characteristic of a capscrew that it is substantially stronger in tension as compared to shear.

In operation, it may be seen that the member 11 may be pivoted about pin 16 and any twisting forces applied to the pin 16 will result in a slight lateral movement of the flange 17 against the sides of the spacer 22 or member 23, to prevent any rotation of the pin 16 relative to the member 10. The hardened surface of the spacer 22 or the member 23 will resist wear and prolong the life of the arrangement. In deflections of the pin 16 along its longitudinal axis, the deflection forces will be transmitted through the flange 17 to the member 10 rather than to the spacer 22 or member 23 to tend to snap the capscrew 20. It has been found that with the present invention no apparent loosening of the capscrew 20 occurs in the normal use of the defined arrangements and that the life thereof is considerably longer than that of other arrangements known and used in the art.

Having described the invention, what is considered new and desired to be protected by Letters Patent is:

1. Means for securing a pin which pivotally interconnects two members comprising, a flange secured on one end of said pin and extending radially outwardly therefrom, an opening formed through said flange, spacer and washer means positioned in said opening and secured to one of said members by a capscrew positioned through said spacer and washer means and threaded into said one of said members until tensioned with the head thereof against the washer portion of said spacer and washer means, said spacer and washer means being formed so that the spacer portion thereof positioned within said opening has an outer diameter sufficiently smaller than the diameter of said opening so that when said pin is deflected along its longitudinal axis sufficient clearance remains between the walls of said opening and the outer surface of said spacer portion so that said flange is projected against said one of said members rather than against said spacer portion, the washer portion of said spacer and washer means having an outer diameter greater than the diameter of said opening.

2. In a device as claimed in claim 1, wherein said spacer and washer means is formed of a material having a surface hardness substantially greater than that of said capscrew.

3. Means for securing a pin which pivotally interconnects two members comprising, a flange secured on one end of said pin and extending substantially radially outwardly therefrom in one direction, an opening formed through the radially extending portion of said flange, a spacer and a washer formed of a surface hardened material, a capscrew projecting through said washer and said spacer and being threaded into one of said members until said capscrew engages said washer and is tensioned thereagainst, said spacer being positioned within the opening in said flange and having an outer diameter sufficiently smaller than the diameter of said opening so that when said pin is deflected along its longitudinal axis sufficient clearance remains between the walls of said opening and the outer surface of said spacer so that said flange is projected against said one of said members, rather than against said spacer, said washer being positioned above said flange and having an outer diameter greater than the diameter of said opening.

4. Means for securing a pin which pivotally interconnects two members comprising, a flange secured on one end of said pin and having a portion extending substantially radially outwardly therefrom, an opening formed through the radially extending portion of said flange, an integral spacer and washer member, a capscrew carrying said spacer and washer member thereon and being threaded sufficiently to produce tension therein into one of said pivotally interconnected members, said capscrew being positioned relative to said flange so that the spacer portion of said spacer and washer member is positioned within said opening of said flange, said spacer portion having an outer diameter sufficiently smaller than the diameter of said opening so that when said pin is deflected along its longitudinal axis sufficient clearance remains between the walls of said opening and the outer surface of said spacer portion so that said flange is projected against said one of said members which are pivotally interconnected rather than against said spacer portion, the washer portion of said spacer and washer member being positioned above said radially extending portion of said flange and having an outer diameter greater than the diameter of said opening.

5. Means for securing a pin which pivotally interconnects two members comprising, a flange secured on one end of said pin and having a portion extending substantially radially outwardly therefrom, an opening formed through the radially extending portion of said flange, spacer and washer means, a capscrew carrying said spacer and washer means and being threaded sufficiently to produce tension therein into one of said pivotally interconnected members, said one of said members being formed to have a depressed portion coaxial with said capscrew with said depressed portion having a diameter substantially equal to the outer diameter of the spacer portion of said spacer and washer means so that a portion of the spacer portion of said spacer and washer means is doweled into said depression, said spacer portion of said spacer and washer means having a depth greater than the depth of said depression and the thickness of said radially extending portion of said flange, said spacer portion of said spacer and washer means further being formed to have an outer diameter sufficiently smaller than the diameter of said opening in said flange so that when said pin is deflected along its longitudinal axis sufficient clearance remains between the walls of said opening and the outer surface of said spacer portion so that said flange is projected against said one of said members rather than against said spacer portion, the washer portion of said spacer and washer means being positioned above said flange and having an outer diameter greater than the diameter of said opening.

References Cited in the file of this patent
UNITED STATES PATENTS

| | | |
|---|---|---|
| 149,362 | Watrous | Apr. 7, 1874 |
| 1,789,326 | Tollerton et al. | Jan. 30, 1931 |
| 1,933,095 | Child | Oct. 31, 1933 |
| 2,713,386 | Holtz | July 19, 1955 |
| 2,838,331 | Coleman | June 10, 1958 |

FOREIGN PATENTS

| | | |
|---|---|---|
| 433,693 | Germany | Sept. 4, 1926 |
| 512,175 | Great Britain | Aug. 30, 1939 |